United States Patent
Miller et al.

(10) Patent No.: US 9,764,618 B2
(45) Date of Patent: Sep. 19, 2017

(54) HVAC SYSTEM WITH TRAVEL TIME BASED CONTROL

(71) Applicant: FORD GLOBAL TECHNOLOGIES, LLC, Dearborn, MI (US)

(72) Inventors: Kenneth James Miller, Canton, MI (US); John Curtis Hickey, Belleville, MI (US); Mark G. Smith, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

(21) Appl. No.: 14/552,992

(22) Filed: Nov. 25, 2014

(65) Prior Publication Data

US 2016/0144689 A1    May 26, 2016

(51) Int. Cl.
*B60H 1/00* (2006.01)

(52) U.S. Cl.
CPC ..... *B60H 1/00964* (2013.01); *B60H 1/00771* (2013.01); *B60H 1/00657* (2013.01)

(58) Field of Classification Search
CPC ............ B60H 1/00964; B60H 1/00771; B60H 1/00657
USPC .......................... 165/202, 232, 267, 268, 270
See application file for complete search history.

(56) References Cited

U.S. PATENT DOCUMENTS

| 7,424,868 | B2 | 9/2008 | Reckels et al. |
| 8,412,381 | B2 * | 4/2013 | Nikovski ............... F24F 11/006 700/276 |
| 8,527,514 | B2 | 9/2013 | Sakuma et al. |
| 8,626,381 | B2 | 1/2014 | Tate, Jr. et al. |
| 2011/0172880 | A1 | 7/2011 | Tamura |
| 2011/0185204 | A1 * | 7/2011 | Louboutin ............... G06F 1/263 713/320 |
| 2012/0324934 | A1 | 12/2012 | Sakai |
| 2013/0166123 | A1 | 6/2013 | Donald, III et al. |
| 2013/0245884 | A1 | 9/2013 | Forutanpour et al. |
| 2015/0129192 | A1 * | 5/2015 | Boss ................... B60H 1/00771 165/202 |

FOREIGN PATENT DOCUMENTS

| DE | 19902201 C2 | 8/2000 | |
| JP | WO 2012017294 A1 * | 2/2012 | ......... B60H 1/00771 |
| WO | 2012017294 A1 | 2/2012 | |

* cited by examiner

*Primary Examiner* — Justin Jonaitis
(74) *Attorney, Agent, or Firm* — Vichit Chea; Brooks Kushman P.C.

(57) ABSTRACT

A system for providing efficient climate control in a vehicle. The system has an HVAC system configured to receive a user-defined temperature. The HVAC system has a cabin temperature sensor. The system has a controller coupled to the HVAC system and coupleable to a mobile device. The controller is programmed to (i) receive an estimated travel time of the vehicle from the mobile device and (ii) modify output of the HVAC system based on the travel time being below a time threshold.

17 Claims, 2 Drawing Sheets

HVAC SYSTEM WITH TRAVEL TIME BASED CONTROL

TECHNICAL FIELD

This disclosure relates to heating, ventilating, and air conditioning (HVAC) systems and more specifically to the control of HVAC systems to improve vehicle efficiency.

BACKGROUND

HVAC systems in vehicles are designed to provide environmental comfort within a passenger space of the vehicle. The goal is to provide thermal comfort to passengers and acceptable cabin air quality. Vehicular HVAC systems typically employ separate heating and cooling systems. The heating system may use pump to move engine coolant to transfer heat from an engine to the passenger compartment. The cooling system may use a compressor to move refrigerant to transfer heat out of the passenger compartment. Energy from the vehicle is required to operate a pump or compressor, or other HVAC system component. Energy to operate HVAC system components may be supplied by a battery, a motor, or by an engine.

Fuel economy of an automobile is the relationship between the distance traveled and the amount of fuel consumed by the vehicle, typically expressed in terms of distance travelled per unit volume of fuel consumed (miles per gallon). In the case of a battery or hybrid vehicle, consumption may be expressed in terms of energy consumed per distance traveled (kilowatt-hour per 100 miles). Since the total force opposing the vehicle's motion (at constant speed) multiplied by the distance through which the vehicle travels represents the energy that the vehicle must expend in order to travel that distance, reduction of energy consumption should improve fuel economy/vehicle efficiency.

One factor potentially negatively affecting fuel economy/vehicle efficiency may be a short trip. Short trips may cause poorer vehicle efficiency ratings than longer trips. One reason may be that the passenger compartment may need extra energy to obtain a desired temperature or humidity faster for the short trip, whereas the longer trip may allow for less energy to be used per distance traveled to maintain an already existing cabin temperature or humidity. The energy expended during the pull-down/heat-up may be divided up over more distance providing for a higher efficiency rating.

SUMMARY

One aspect of this disclosure is directed to a system for providing efficient climate control in a vehicle. The system has an HVAC system configured to receive a user-defined temperature or humidity. The HVAC system also has a cabin temperature sensor. The system has a controller coupled to the HVAC system and coupleable to a mobile device. The controller is programmed to (i) receive an estimated travel time based on trip distance of the vehicle from the mobile device and (ii) modify output of the HVAC system based on the travel time being below a time threshold.

The controller may extract an estimated travel time from a navigation application on the mobile electronic device. The controller may extract data related to local businesses from a browser history of the mobile device and estimate a destination based on travel direction toward an identified local business.

When the user-defined temperature is above the actual cabin temperature, the modified HVAC profile may inhibit engine spark retardation. When the user-defined temperature is above the actual cabin temperature, the modified HVAC profile may inhibit increases in shift schedules. When the user-defined temperature is below the actual cabin temperature, the modified HVAC profile may inhibit use of an air-conditioning compressor. When the user-defined temperature is between an ambient temperature and cabin temperature, the modified HVAC profile may utilize ambient air blown into the cabin.

The system may also have an operator opt-out switch coupled with the controller configured to allow the operator to override the modified HVAC profile.

Another aspect of this disclosure is directed to a vehicle having an engine, an HVAC system, an infotainment system configured to pair with a mobile device, and a controller coupled with the engine, HVAC system, and infotainment system. The controller in this aspect is programmed to identify a destination from the mobile device, estimate a travel time from a current location to the destination, and optimize the HVAC system to balance cabin comfort with engine fuel economy based on the travel time.

A further aspect of this disclosure is directed to the controlling an HVAC system in a vehicle. This aspect includes receiving a cabin temperature and a user-defined temperature, a travel time based on a current location and an identified destination of the vehicle, and operating the HVAC system to align the cabin temperature with the user-defined temperature at a first output magnitude if the travel time is below a threshold and a second output magnitude if the travel time exceeds the threshold.

The travel time may be provided by a navigation program. The navigation program may be provided by a mobile device. This aspect may further include receiving a recent browser history from the mobile device, comparing websites from the recent browser history with local destinations, tracking the current location of the vehicle to determine if the vehicle is heading toward one of the local destinations, and selecting the one of the local destinations the vehicle is heading toward as the identified destination. The recent browser history may comprise at least four web pages browsed in reverse chronological order within at least one hour prior to starting the car or initiating the HVAC system.

This aspect may also further include receiving an ambient temperature. The ambient temperature may be provided by a mobile device. The first output magnitude may include blowing ambient air into the cabin if the ambient temperature is between the cabin and user-defined temperatures. The first output magnitude may include inhibiting the retarding of spark in an engine to improve fuel economy when the user-defined temperature is higher than the cabin temperature. The second output magnitude may include the initiating of retarding of spark in an engine to provide heat to a cabin faster when the user-defined temperature is higher than the cabin temperature.

The first output magnitude may include inhibiting advanced shift schedules to improve fuel economy when the user-defined temperature is higher than the cabin temperature. The second output magnitude may include initiating advanced shift schedules to provide heat to a cabin faster when the user-defined temperature is higher than the cabin temperature. The first output magnitude may reduce the duty cycle, such as the cycling, the speed, or the displacement, of an air-conditioning compressor to improve fuel economy when the user-defined temperature is lower than the cabin temperature. The second output magnitude may increase the duty cycle of an air-conditioning compressor to cool the cabin faster when the user-defined temperature is lower than the cabin temperature.

The first output magnitude may include clearing hot air from the cabin using ambient air, operating the air-conditioning compressor at a standard rate, speed, or displacement for a first period of time, and modifying the duty cycle of the air-conditioning compressor to a reduced rate for a second period of time prior to reaching the identified destination. This aspect may also include providing an opt-out setting for a user to override the first output magnitude with the second output magnitude.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
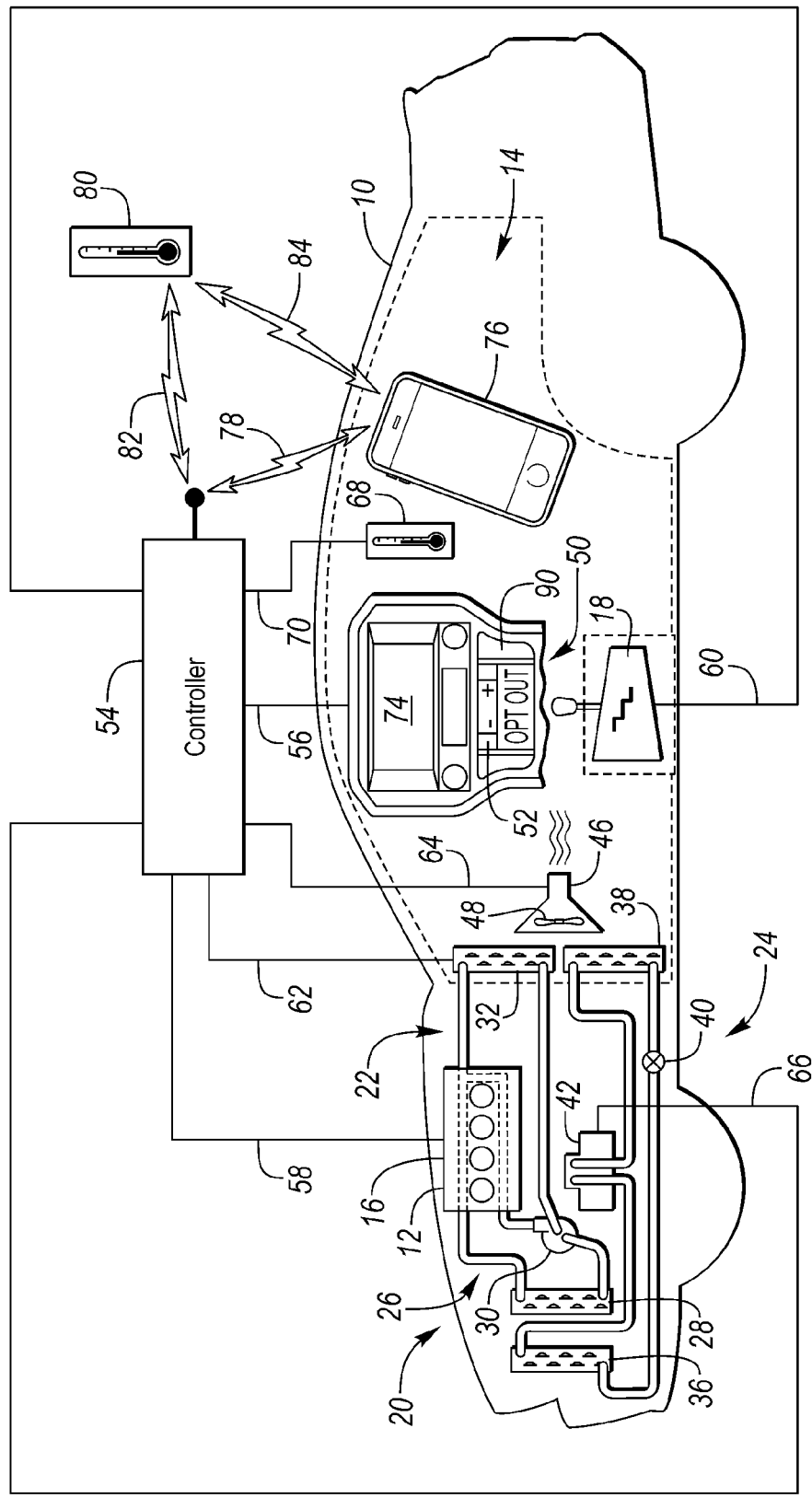
FIG. 1 is a diagrammatic illustration of a vehicle having an HVAC system with improved efficiency based on travel time.

FIG. 1 shows a vehicle 10 having a prime mover 12 and a passenger compartment 14. Prime mover 12 may supply the energy to move the vehicle 10 from one location to another. Prime mover 12 may be an engine 16, depicted here as an internal combustion engine, or an electric motor, or some other form of energy provider, or any combination of the above. Vehicle 10 may also have a transmission 18 coupled with the prime mover 12 to provide speed and torque conversions from the prime mover 12 to move the vehicle 10. Vehicle 10 is also shown having an HVAC system 20. The HVAC system 20 may have a heating circuit 22 separate from a cooling circuit 24, as shown, however a single circuit or multiple additional circuits may be used.

The heating circuit 22 may be part of, or supplemental to, an engine cooling system 26. The engine cooling system 26 may have a radiator 28, a pump 30, and a heater core 32. A heat transfer fluid, such as coolant, may be moved from the radiator 28 and into the engine 16 by the pump 30. The heat transfer fluid may receive heat energy from the engine 16 and travel back to the radiator 28 to release the heat energy to the environment. The pump 30 may also pull heat transfer fluid from the engine 16 through the heater core 32 to transfer heat energy into the passenger compartment 14. Heater core 32 may also be an electric heater. An electric heater may not require the use of coolant run through an engine as shown in FIG. 1. The pump 30 and heater core 32, directly or indirectly, obtain energy from the prime mover 12. The pump 30 may be an electric pump running off a battery which may be recharged by the prime mover 12, at least in part, or may be run off an auxiliary drive belt (not shown) of the engine 16. The more energy needed to heat the passenger cabin 14, the more energy is needed from the prime mover 12.

The cooling circuit 24 may have an external heat exchanger 36, also known as a condenser, an internal heat exchanger 38, also known as an evaporator, an expansion valve 40, and a compressor 42. The compressor 42 pumps a heat transfer fluid, such as refrigerant, up to a high pressure and temperature and into the external heat exchanger 36 where it loses energy (heat) to the environment and typically condenses into a liquid phase. The expansion valve 40, also known as a metering device, regulates the heat transfer fluid to flow at the proper rate. The lower pressure, lower temperature heat transfer fluid is passed through the internal heat exchanger 38 where it is allowed to evaporate. As the heat transfer fluid evaporates it absorbs energy (heat) from the passenger compartment 14, returning to the compressor and repeating the cycle. The compressor 42, directly or indirectly, obtains energy from the prime mover 12. The compressor 42, like the pump 30, may be run by an electric motor or be run off an auxiliary drive belt (not shown) of the engine 16. The more energy needed to cool the passenger cabin 14, the more energy is needed from the prime mover 12.

The heating and cooling circuits 22, 24 may share a central ducting system 46 having a fan 48 or blower 48 to circulate cabin air through or across the heat exchanger 32 and/or evaporator 38. Alternatively the heating and cooling circuits 22, 24 may have separate air ducting systems. A series of valves or flaps (not shown) may be used to change the ducting of heated or cooled air throughout the passenger cabin 14. The ducting system 46 may be used to recirculate cabin air within the passenger compartment 14 or pull air from the exterior environment.

The HVAC system 20 may have an operator interface 50. The operator interface 50 may have buttons 52, switches, touch sensors, or the like that allow an operator to manually turn on or off the HVAC system 20, switch between heating and cooling circuits 22, 24, modify blower 48 speed, operate valves to change ducting of the heated or cooled air, or switch between recirculating the cabin air or pulling air from the exterior environment, among others. The operator interface 50 may be coupled with the rest of the HVAC system 20 through a controller 54, as indicated by communication line 56.

The controller 54 may be programmed to provide a number of different features depending on how a user may operate the operator interface 50 and may be coupled with a number of different components in the HVAC system 20 to receive data from or to control. For example, the controller 54 may be coupled with the engine 16, as indicated by communication line 58, to provide spark retardation to increase the speed at which the coolant is heated up and the rate at which the passenger compartment may be heated up. Communication line 58 may also provide data back to the controller relating to the prime mover 12; energy availability, coolant temperature, or other prime mover 12 parameter. In the case of a hybrid vehicle, when a battery state-of-charge may not be sufficient to operate the HVAC system 20 to the desired level of the operator, the controller 54 may be programmed to turn the engine 16 on and run the engine 16, via communication line 58, to provide the needed energy to operate the system.

The controller 54 may be coupled with the transmission 18, as indicated by communication line 60, to increase shift schedules to run the engine 16 at higher rpm to generate heat faster. The controller 54 may be coupled with the heater core 32, as indicated by communication line 62, to turn the heater core on or off (if electric), to change in settings of magnitude of use, or to supply data on heater core temperature, coolant temperature, or other heating circuit 22 parameter back to the controller 54. The heating circuit 22 may also employ solenoids or thermostats (not shown) to modify coolant flow, and communication line 62 may be used by the controller to receive data or control such devices.

The controller 54 may be coupled with the ducting system 46 or blower 48, as indicated by communication line 64, to change the ducting of heated air throughout the passenger cabin 14, to recirculate cabin air within the passenger compartment 14 or pull air from the exterior environment, or to modify the speed of the blower 48. Communication lines 58, 60, 62 and 64 represent the ability for the controller 54 to receive the necessary data from, and operate and control the heating circuit 22 of the HVAC system 20. Although communication lines 58, 60, 62 and 64 are shown, fewer or greater components and corresponding communication lines may be used to operate the heating circuit 22. As well, vehicle 10 may have an internal communication network (not shown), such as a CAN BUS, and the controller may utilize the internal communication network to access needed data or to send control signals to the components or other controllers that control the components.

The controller 54 may be coupled with the compressor 42, as indicated by communication line 66. In the case of a hybrid vehicle, the controller 54 may be programmed to turn on and run the engine 16, via communication line 58, to provide additional energy to the battery to operate an electric motor compressor 42 or to run the auxiliary drive belt to operate an engine driven compressor 42. Communication lines 58, 64, and 66 represent the ability for the controller 54 to receive the necessary data from, and to operate and control the cooling circuit 24 of the HVAC system 20. Although communication lines 58, 64, and 66 are shown, fewer or greater components and corresponding communication lines may be used to operate the cooling circuit 24.

The operator interface 50 may also have an automatic (AUTO) mode that allows the operator to select a user-defined cabin temperature which the controller 50 is then programmed to automatically operate the HVAC system 20 to achieve the user-defined cabin temperature as set by the operator. A cabin temperature sensor 68 may be coupled with the HVAC system 20 through the controller 50, as indicated by communication line 70, to provide data to the controller on an actual cabin temperature. The control may be programmed to automatically determine whether the passenger compartment requires heating or cooling to achieve the user-defined temperature. When the user-defined temperature is further away from the actual cabin temperature, the controller 54 may control the HVAC system 20 to provide a greater magnitude of heating or cooling to reach the user-defined temperature faster. When the user-defined temperature is closer to the actual cabin temperature, the controller 54 may control the HVAC system 20 to provide a lesser magnitude of heating or cooling to reach the user-defined temperature.

Vehicle 10 may also have an infotainment system 74. The operator interface 50 for the HVAC system 20 may be part of the infotainment system 74, may be a separate interface located adjacent to an infotainment system 74, or may be a separate interface located in a different part of the vehicle 10. The controller may be in communication with the infotainment system 74 and the operator interface 50 via communication line 46 or a separate communication line (or through the internal communication network. The infotainment system 74 may be coupled with a mobile device 76, as represented by communication line 78. The controller 54 may be wirelessly coupled with the mobile device 76 or the mobile device may be plugged into the vehicle 10 in such a way as for the controller 54 to access information from the mobile device 76. Mobile device 76, also known as a nomadic device, may be a mobile phone, laptop computer, tablet, or any number of mobile electronic devices that may have wireless remote network connectivity. The mobile device 76 may also be any portable device that may provide a navigation application.

The infotainment system 74 may be a vehicle based computing system (VCS). An example of such a VCS is the SYNC system manufactured by THE FORD MOTOR COMPANY. The infotainment system 74 may be configured to pair with the mobile device 76 via BLUETOOTH or other wireless interconnections.

The controller 54 is also configured to receive an external environment temperature, this may be accomplished by an exterior temperature sensor 80, or alternatively wireless communication with another system or network that can provide an external environment temperature, as indicated by communication line 82, or from the mobile device 76 being in communication with another system or network that can provide an external environment temperature, as indicated by communication line 84, through the mobile device 76 and to the controller 54.

The mobile device 76 may be configured to have a program which can provide navigation to the user from the user's current position to an identified destination. The controller 54 may be coupled with the HVAC system 20, and infotainment system 74, and programmed to extract the identified destination from the mobile device 76. The controller 54 may then be able to optimize the HVAC system 20 to balance cabin comfort with engine fuel economy based on the travel time from the current location of the vehicle to the destination of the vehicle.

The controller 54 may be programmed to receive an estimated travel time of the vehicle 10 from the mobile device 76. The controller 54 may extract the estimated travel time from a navigation application on the mobile device 76. The controller 54 may modify output of the HVAC system 20 based on the travel time being below a time threshold. The modified HVAC system output may be referred to as a HVAC profile. The modified HVAC profile, when the travel time is below a time threshold, may inhibit engine spark retardation when the user-defined temperature is above the actual cabin temperature. The modified HVAC profile may inhibit increases in shift schedules when the travel time is below the threshold and the user-defined temperature is above the actual cabin temperature.

The controller may be programmed to provide a modified HVAC profile that inhibits use of the air-conditioning compressor 42 when the travel time is below the threshold and the user-defined temperature is below the actual cabin temperature. The modified HVAC profile in this case may utilize ambient air to clear hot cabin air.

The vehicle 10 may also have additional heating and cooling features that may or may not be considered part of a traditional HVAC system that provide climatic comfort to passengers. An example of this is heated and cooled seats (not shown). Controller 54 may also be connected to these additional heating and cooling features and programmed to inhibit the use of the heating and cooling features when the travel time is below the threshold.

The HVAC system 20 may also have an operator opt-out switch 90. The opt-out switch 90 may be coupled with the controller 54 configured to allow the operator to override the modified HVAC profile. The opt-out switch 90 may be located on the operator interface 50. The opt-out switch 90 may also be a touch screen button on a screen of the infotainment system 74.

Figure 2:
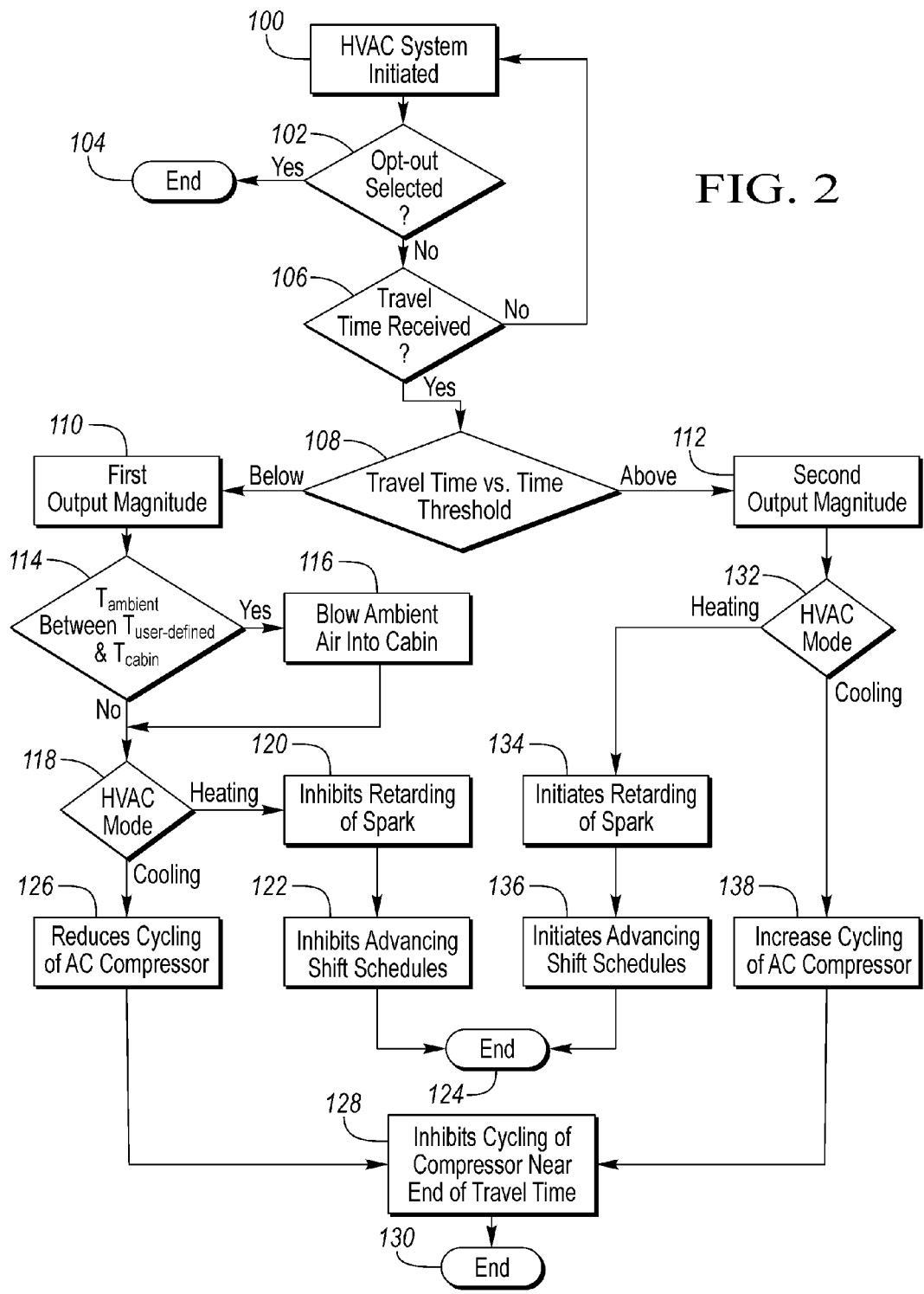
FIG. 2 is a flowchart illustrating an example of an HVAC system with improved efficiency based on travel time.

FIG. 2 is a flowchart illustrating an example of an HVAC system with improved efficiency based on travel time. At action rectangle 100 an HVAC system is initiated. Action rectangle 100 flows to decision diamond 102 providing an opt-out setting for a user to override the system. If the opt-out is selected, then the logic flow ends at end 104.

If the opt-out is not selected, then the logic flows to decision diamond 106. At decision diamond 106, the logic flow determines if a travel time has been received. If a travel time has not been received, then the logic flows back to action rectangle 100 and may remain in a do-loop until such information is received, the HVAC system is turned off, or the opt-out is selected.

The travel time may be based on the estimated amount of time it may take to travel between a current location and an identified destination of a vehicle. The travel time may take into account speed limits of roads between the locations and traffic flow patterns. The travel time may be provided by a navigation program. The navigation program may be provided by a mobile device. The travel time may be based on receiving a recent browser history from a mobile device by comparing websites from the recent browser history with local destinations, and selecting a local destination as identified destination. This scenario may include tracking a current location of the vehicle to determine if the vehicle is heading toward one of the local destinations and then selecting the local destination the vehicle is heading toward as the identified destination. The recent browser history may comprise at least four web pages browsed in reverse chronological order within at least one hour prior to starting the HVAC system.

If a travel time has been received, the logic flows to decision diamond 108 wherein the travel time is compared to a time threshold. The time threshold may be set at a constant time duration, such as 15 minutes regardless of conditions, although any time duration may be used. The time threshold may also vary depending on cabin temperature. For example, if the cabin temperature is between 50 degrees and 80 degrees Fahrenheit, then the time threshold may be set at 30 minutes. If the cabin temperature is between 35 degrees and 50 degrees Fahrenheit, or between 80 degrees and 95 degrees Fahrenheit, the time threshold may be set at 15 minutes. If the cabin temperature is below 35 degrees or above 95 degrees Fahrenheit, the time threshold may be set at 5 minutes.

If the travel time is below the time threshold, the logic flows to action rectangle 110. Action rectangle 110 provides for the operating of the HVAC system to align the cabin temperature with the user-defined temperature at a first output magnitude. If the travel time is above the time threshold, the logic flows to action rectangle 112. Action rectangle 112 provides for the operating of the HVAC system to align the cabin temperature with the user-defined temperature at a second output magnitude.

Under the first output magnitude 110, the logic may flow to a decision diamond 114 to compare an ambient temperature with a cabin temperature and a user-defined temperature. If the ambient temperature is between the cabin and user-defined temperatures, the logic flows to action rectangle 116 and ambient air may be blown into the cabin before moving to decision diamond 118. If the ambient temperature is outside of the cabin and user-defined temperatures, then the logic flows directly to decision diamond 118.

Decision diamond 118 determines what primary HVAC mode the system is operating in; whether the system is heating or cooling. An HVAC mode may be selected by a user, or determined simply by the direction the user defined temperature is away from the cabin temperature. When the user-defended temperature is above the cabin temperature, the HVAC may be in a heating mode. If the user-defined temperature is below the cabin temperature, the HVAC may be in a cooling mode.

If the HVAC system is in a heating mode the logic may flow to action rectangle 120, wherein spark retarding is inhibited. The logic flow may also flow to action rectangle 122, wherein advancing shift scheduling is inhibited. The logic may then flow to an end 124. Action rectangles are shown in order, but it should be understood that these may be in either order, simultaneously achieved, or one or the other may not be utilized. As discussed above, spark retarding and advancing of shift schedules provides faster heat to the passenger cabin, but at a loss of fuel economy and efficiency. If the travel time is short, then the loss of vehicle efficiency is not worth the increased heating capacity.

If the HVAC system is in a cooling mode the logic may flow to action rectangle 126, wherein the duty cycle of an air-conditioning compressor is reduced for a period of the duration. The logic flow may also move to action rectangle 128, wherein the operation of the compressor is completely inhibited near the end of the travel time. The duty cycle of the compressor may be run at full speed for a beginning portion of the trip, be reduced for a middle portion of the trip, and shut off near an end portion of the trip, or any combination of the above. Reduction of the duty cycle may include a modification of the cycling, the speed, or the displacement, among others, of the compressor to reduce energy draw. Upon reduction of compressor energy draw, the logic flow may come to an end 130. The first output magnitude flow path reduces the duty cycle of an air-conditioning compressor during the cooling mode to improve fuel economy and vehicle efficiency. In all, the first output magnitude may include clearing hot air from the cabin using ambient air, operating of the air-conditioning compressor at a standard rate for a first period of time, modifying the duty cycle of the compressor to be at a reduced rate for a second period of time, and finally inhibiting the use of the compressor prior to reaching the identified destination.

Returning to the flow path of the second output magnitude 112, the logic flows to an HVAC mode decision diamond 132 similar to that of decision diamond 118. In this branch of the logic flow, when in the heating mode the logic flows though action rectangles 134 and 136 before coming to end 124. Action rectangles 134 and 136 initiate the retarding of spark in the engine and advancing of the shift schedules in the transmission, which may both individually increase the heating ability of the HVAC system. As with the other branch flowing through action rectangles 120 and 122, action rectangles 134 and 136 may be performed in either order, simultaneously, or only one of the two implemented.

If the HVAC system is in a cooling mode the logic may flow to action rectangle 138, wherein the compressor is allowed to maintain full power to provide the maximum amount of cooling available from the HVAC system to the cabin. After action rectangle 138, the second output magnitude branch may also include action rectangle 128 before coming to end 130, in which the compressor duty cycle is modified or is inhibited near the end of the travel time. In either the first output magnitude or second magnitude branches, it may still be desirable to reduce or inhibit the duty cycle of the air-conditioning compressor a period of time before reaching a destination to conserve the energy.

The logic flowchart of FIG. 2 is an example of a flow logic for an HVAC system having travel time based control. Some of the steps in this example may be completed in different orders, some of the steps may be skipped, and additional steps may be added. The logic flowchart merely illustrates one example of how to operate an HVAC system having similar structure to that as described in the description of FIG. 1.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle climate control system comprising:
   an HVAC system configured to receive a user-defined temperature and having a cabin temperature sensor;
   a controller coupled to the HVAC system, coupleable to a wireless mobile device, and programmed to wirelessly receive an estimated vehicle travel time from the device and modify HVAC system output based on the time being below a threshold; and
   a switch coupled with the controller and configured to override the modified HVAC output.

2. The system of claim 1 wherein the controller extracts an estimated travel time from a navigation application on the wireless mobile device.

3. The system of claim 1 wherein the user-defined temperature is above the actual cabin temperature and the modified HVAC output inhibits engine spark retardation.

4. The system of claim 1 wherein the user-defined temperature is above the actual cabin temperature and the modified HVAC output inhibits increases in shift schedules.

5. The system of claim 1 wherein the user-defined temperature is below the actual cabin temperature and the modified HVAC output inhibits use of an air-conditioning compressor.

6. The system of claim 5 wherein the modified HVAC output utilizes ambient air to clear hot cabin air.

7. A method of controlling an HVAC system in a vehicle comprising:
   receiving a cabin temperature;
   receiving a user-defined temperature;
   receiving a travel time from a wireless mobile device and based on a current location and an identified destination of the vehicle;
   operating the HVAC system to align the cabin temperature with the user-defined temperature at a first output magnitude if the travel time is below a threshold and a second output magnitude if the travel time exceeds the threshold; and
   providing an opt-out setting for a user to override the first output magnitude with the second output magnitude.

8. The method of claim 7 wherein the travel time is provided by a navigation program.

9. The method of claim 8 wherein the navigation program is provided by the wireless mobile device.

10. The method of claim 7 further comprising:
    receiving a recent browser history from the wireless mobile device;
    comparing websites from the recent browser history with local destinations;
    tracking the current location of the vehicle to determine if the vehicle is heading toward one of the local destinations; and
    selecting the one of the local destinations the vehicle is heading toward as the identified destination.

11. The method of claim 10 wherein the recent browser history comprises at least four web pages browsed in reverse chronological order within at least one hour prior to starting an HVAC cycle.

12. The method of claim 7 further comprising receiving an ambient temperature, and wherein the first output magnitude includes blowing ambient air into the cabin if the ambient temperature is between the cabin and user-defined temperatures.

13. The method of claim 12 wherein the ambient temperature is provided by the wireless mobile device.

14. The method of claim 7 wherein when the user-defined temperature is higher than the cabin temperature, the first output magnitude inhibits retarding of spark in an engine to improve fuel economy, and the second output magnitude initiates retarding of spark in an engine to provide heat to a cabin faster.

15. The method of claim 7 wherein when the user-defined temperature is higher than the cabin temperature, the first output magnitude inhibits advanced shift schedules to improve fuel economy, and the second output magnitude initiates advanced shift schedules to provide heat to a cabin faster.

16. The method of claim 7 wherein when the user-defined temperature is lower than the cabin temperature, the first output magnitude reduces the duty cycle of an air-conditioning compressor to improve fuel economy, and the second output magnitude increases the duty cycle of an air-conditioning compressor to cool the cabin faster.

17. The method of claim 16 wherein the first output magnitude includes clearing hot air from the cabin using ambient air, operating the duty cycle of the air-conditioning compressor at a standard rate, speed and displacement for a first period of time, and modifying the duty cycle of the air-conditioning compressor to a reduced rate, speed or displacement for a second period of time prior to reaching the identified destination.

* * * * *